United States Patent
Ewanchuk et al.

(10) Patent No.: US 7,287,076 B2
(45) Date of Patent: Oct. 23, 2007

(54) PERFORMING THRESHOLD BASED CONNECTION STATUS RESPONSES

(75) Inventors: Brian Joseph Ewanchuk, Redmond, WA (US); Mark Gerald Favero, Seattle, WA (US); James Stuart Johnson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 906 days.

(21) Appl. No.: 10/748,310

(22) Filed: Dec. 29, 2003

(65) Prior Publication Data
US 2005/0188052 A1   Aug. 25, 2005

(51) Int. Cl.
*G06F 13/00* (2006.01)

(52) U.S. Cl. ............... 709/224; 709/219; 709/227; 709/250

(58) Field of Classification Search ............... 709/217, 709/219, 223, 224, 227, 237, 250
See application file for complete search history.

(56) References Cited

U.S. PATENT DOCUMENTS

| | | | |
|---|---|---|---|
| 5,802,304 A | 9/1998 | Stone | |
| 5,862,339 A | 1/1999 | Bonnaure et al. | |
| 6,091,737 A * | 7/2000 | Hong et al. | 370/431 |
| 6,157,618 A | 12/2000 | Boss et al. | |
| 6,219,669 B1 * | 4/2001 | Haff et al. | 707/10 |
| 6,295,556 B1 | 9/2001 | Falcon et al. | |
| 2004/0034701 A1 * | 2/2004 | Kasper, II | 709/224 |
| 2004/0071133 A1 * | 4/2004 | Yusko et al. | 370/356 |
| 2004/0204133 A1 * | 10/2004 | Andrew et al. | 455/566 |

OTHER PUBLICATIONS

Skonnard, Aaron; "Dialing Up the Internet with RAS"; *Microsoft Interactive Developer*, Jun. 1998; 23 pages.
"Cisco MWC Server Error Codes—Cisco Wireless Network Management Software Suite", 8 pages, downloaded Jun. 29, 2004, http://www.cisco.com/en/US/products/sw/wirelssw/ps4733/products_user_guide09186a008011a984.html#xtocid0.
"Remote Access Service (RAS) Error Code List"; *Microsoft Knowlege Base Article—163111*; Sep. 15, 2003; 4 pages.
"Open Transport/PPP: Error Codes"; *TECHNINFO-0020977*, 4 pages, downloaded Dec. 7, 2003, http://www.mug.jhmi.edu/mirrors/InfoAlley/0297/17/open.html.
"Enable Internet connection sharing on a network connection", © *2000 Microsoft Corporation*, Feb. 28, 2000; 1 page.
"Configure TCP/IP settings"; © *2000 Microsoft Corporation*, Feb. 28, 2000; 1 page.

(Continued)

*Primary Examiner*—Viet D. Vu
(74) *Attorney, Agent, or Firm*—Klarquist Sparkman, LLP

(57) ABSTRACT

A connection manager receives connection status indicators from a remote access service and invokes status threshold based responses. A received status indicator is received in response to a connection request. In another example, the status indicator is pushed to the connection manager. Status indicators are recorded in a status data structure. Status threshold based responses are identified in a status threshold response data structure. When a status indication count corresponds with a threshold value in a status threshold response data structure, a corresponding status threshold based response is invoked. A status data structure is sent to a remote server, and a new status data structure is received. In another example, a new status threshold response data structure is received. In another example, one or more new or updated status responses are received.

37 Claims, 15 Drawing Sheets

OTHER PUBLICATIONS

"Connection Manager Theory (Pocket PC Adaptation Kit for Mobile Operators)"; © *2003 Microsoft Corporation*, 2 pages.
"Configure Internet options for Internet connection sharing"; © *2000 Microsoft Coropration*, Feb. 28, 2000; 1 page.
"The Connection Manager (Programming Windows CE)", © *2003 Microsoft Corporation*, 5 pages.
"Remote Access Service"; © *2003 Microsoft Corporation*, 2 pages.
"cc:Mail Mobile Error Codes", printed from http://www.mit.edu/~cbatten/watchdog/Errormsg.html on Dec. 10, 2003; 14 pages.
"Agilent Technologies Wireless Dictonary", © *2000-2003 Agilent Technologies*, 66 pages.

* cited by examiner

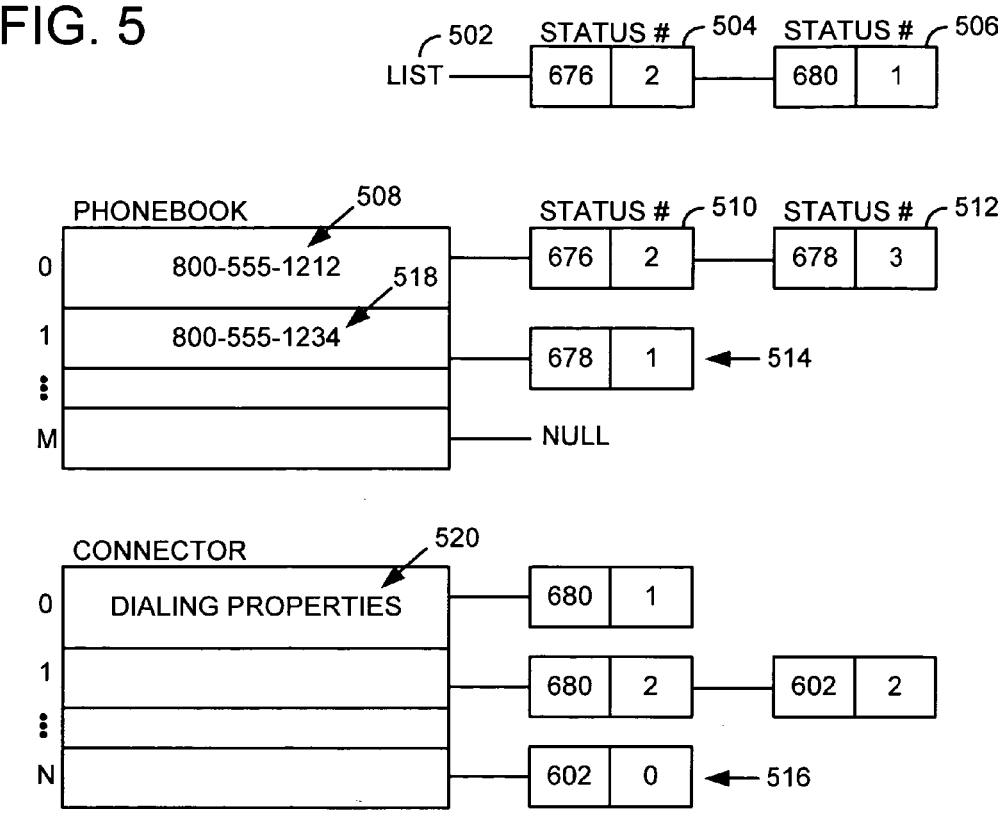

PERFORMING THRESHOLD BASED CONNECTION STATUS RESPONSES

TECHNICAL FIELD

The technical field relates to managing computing device connections to remote resources.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Microsoft Corporation, as an Internet service provider, provided MSN 8.0 software for connecting to the Internet. The software supported dial-up connections using a remote access service component. The software included an embedded phone book with plural dial-up connection telephone numbers that the computer calls to establish a connection. The phone book numbers were dialed in order until a connection is made. For example, when a connection request returned a busy telephone error code, that information was saved in a log for this dialing session. When a connection was finally made in this dialing session, the saved log of the previous dialing session was sent to a remote server. The sent dialing session log was used by the remote server to create new phone books based on dialing sessions for multiple users in a geographic location. However, until a new phone book is received, in subsequent dialing sessions, the existing phone numbers were dialed in the same order even when the first few numbers were busy multiple times in previous dialing sessions.

SUMMARY

The described technologies provide methods and systems for managing a connection to a remote resource.

In one example, a connection manager receives connection status indicators from a remote access service and invokes status threshold based responses. In one such example, a received status indicator is received in response to a connection request. In another example, the status indicator is pushed to the connection manager. In an example, status indicators are recorded in a status data structure. In another example, status threshold based responses are identified in a status threshold response data structure. In other examples, when a status indication count corresponds with a threshold value in a status threshold response data structure, a corresponding status threshold based response is invoked. In one such example, a phonebook is modified locally in response to a threshold number of received status indicators. In another example, a status data structure is sent to a remote server, and a new status data structure is received. In another example, a new status threshold response data structure is received. In another example, one or more new or updated status responses are received.

Additional features and advantages will be made apparent from the following detailed description, which proceeds with reference to the accompanying drawings.

BRIEF DESCRIPTION OF THE DRAWINGS

FIG. 5 is a diagram of an exemplary system for storing status information.

FIG. 6 is a diagram of an exemplary table data structure of a threshold based status response.

DETAILED DESCRIPTION

Overview

The following examples describe methods and systems for managing communications from a device to remote resources. One or more applications running on a computing device request a resource requiring remote access to another device, computer, and/or network. The computing device is any type of device with a processor, memory, and a hardware component for connecting and communicating with a remote computer or network. The hardware component is a modem or other transmitter/receiver that communicates with the computer or network via the connection. The connection and/or communication is conducted according to any communications protocol, wireless or otherwise. Status information is available about a connection request or a connection state. Connection management logic maintains, requests, and/or receives the status information. Status data is logged in a data structure. Status logs are compared against threshold data in order to identify corresponding behaviors. When a logged status is determined to have reached a threshold value, the corresponding behavior is performed.

Exemplary Network Connection

Figure 1:
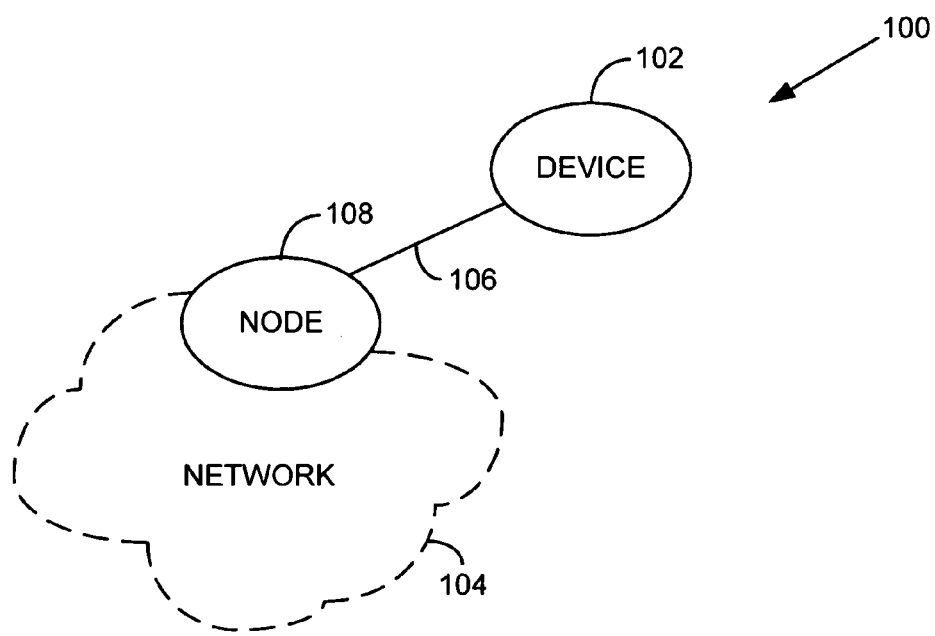
FIG. 1 is an exemplary block diagram of a system for connecting a device to a remote resource.

FIG. 1 is an exemplary block diagram of a system for connecting a device to a remote resource. In one example, a remote resource is located at a node 108 with which the device is communicating. In another example, the system includes a network 104, and remote resources exists at one or more other nodes on the network 104. In another example, a device 102 is a computer and is connecting to the Internet via a dial-up connection 106 to another computer 108. In one such example, the other computer 108 is an Internet service provider (ISP) that receives the dial-up connection request from the device 102, and provides access to the remote resource(s). In another example, the device 102 is a wireless device such as a wireless telephone, a wireless personal assistant, or other wireless device, and the connection is a wireless connection.

Exemplary Device

Figure 2:
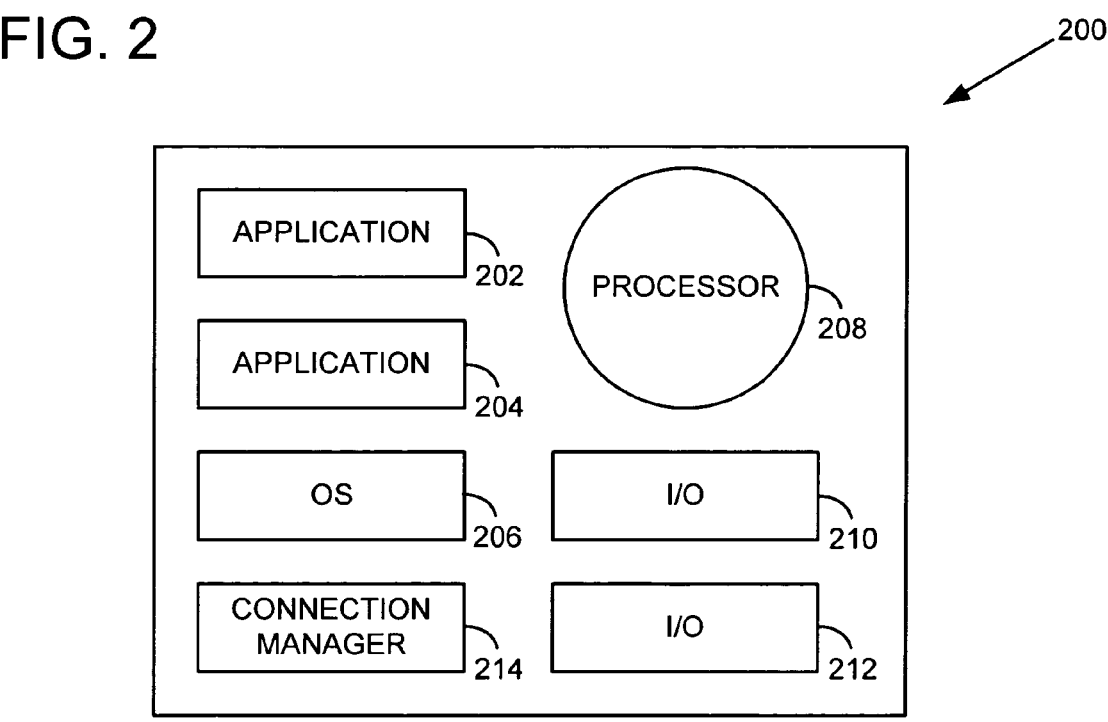
FIG. 2 is an exemplary block diagram of a device including an application, an operating system, and other software and hardware for managing a connection to a remote resource.

FIG. 2 is an exemplary block diagram of a device including one or more applications 202, 204, an operating system 206, and other software and hardware for managing a connection to a remote resource. The device also includes a processor 208 and one or more input-output (I/O) device(s) 210, 212. In another example, the I/O device comprises a modem (whether internal or external). In one example, the I/O device further includes a display, a mouse, a key entry, and/or an audio device. In one example, the display includes screen touch entry capabilities. A device 200 is a PC, a cell phone, or other electronic device containing one or more applications 202, 204 requiring access to a remote computer and/or network. In the case of a network, the network is the Internet, a wireless telephone network, a satellite network, and/or any other network or combinations of networks required to access and transfer remote resource(s). In one example, the device includes a connection manager 214 that manages a connection to remote resource(s). A device also comprises software and hardware, for transmitting and receiving with a network node providing access to a remote resource(s).

Exemplary Applications

A device contains one or more applications requesting remote resources. Applications comprise any software requesting remote services. This does not require the application to have state indicating that the resource is remote, though it may. An application may request a resource that a device system service determines is a resource remote from the device. Further, an application may request a resource and a system service determines that a remote resource is required in order to perform the requested system service. Finally, system services also require remote resources from time to time. Thus, any software requesting a remote resource or causing other software to request a remote resource is contemplated as an application requesting a connection to a remote resource(s).

The types of applications that run on devices, whether wireless or otherwise, is well known in the arts, such as voice services, e-mail services, audio services, video services, database services, Internet services, etc.

Exemplary Connection Requests

Figure 3:
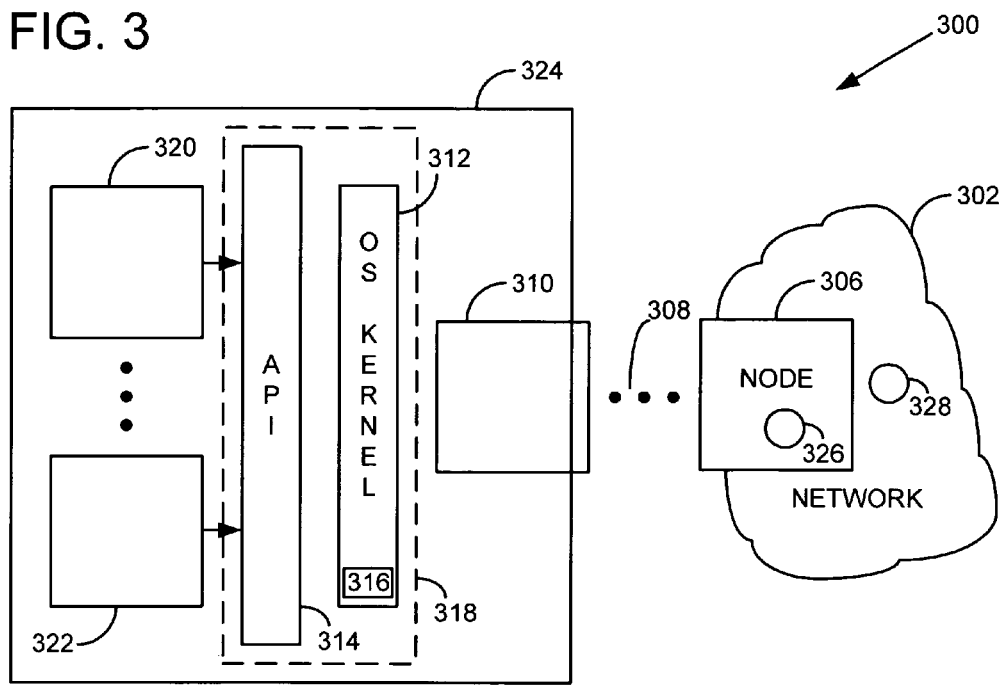
FIG. 3 is an exemplary block diagram of a system for establishing a connection to a network.

FIG. 3 is an exemplary block diagram of a system for establishing a connection to a network. As shown, a device 324 includes one or more applications 320, 322 that need to utilize one or more remote resource 326, 328 on a remote computer 306 or on a network 302, whether wireless or otherwise. The device 324 communicates with one or more node(s) 306 on the network over a connection 308 in order to communicate with remote resources available on the network. The connection 308 is supported through any communications protocol whether wireless or otherwise, such as a LAN, telephone lines, cellular wireless, wi-fi, blue tooth, etc. For example, the device includes a hardware component 310 (e.g., a modem, transmitter/receiver, etc.) that communicates via the connection 308, with a node 306 of the network. The device 324 communicates with plural nodes on the network in cases where the device is mobile, and the plural nodes hand-off communications with the device as the device moves relative to the plural nodes (e.g., wireless phones and other wireless devices). The hardware component 310 that communicates with the network 302 via the shared connection 308 on behalf of the device, can be internal or external to the device.

In one example, the device 324 is a personal computer, the shared connection is a dial-up connection 308, the hardware component 310 is an internal modem, the node 306 is an ISP, the remote resources are web servers 328, 326, and the connection 308 is "utilized" by one or more applications 320, 322 (e.g., a browser, a multimedia player) requesting web services.

The device 324 includes an operating system kernel 312 exposing an application programming interface (API) 314 that an application uses to obtain access to system services. When an application 310 needs to obtain remote services at a network 302, the OS establishes a connection 308 to the network 302 using the hardware component 310. The hardware component 310 is a device that establishes a connection with a network, transmits and receives data over that connection, and terminates the connection. For example, if the hardware component is a modem or other transmitter or receiver, the OS will access a driver component 316 to send and receive communications via the hardware component 310 to the network. For example, if the hardware component is a modem, the driver component is a modem driver.

As shown, the device also comprises logic 318 for managing the connection 308. The logic for managing the connection holds state information about one or more applications (i.e., process) utilizing the connection 308. The logic for managing a shared connection 318 is shown with dotted lines to illustrate that the logic can be implemented as software or hardware, and that if it is implemented as software, it can reside anywhere in a method call path between an API call requesting a remote resource, and a call to the hardware component 310. Thus, in one example the logic 318 is implemented when a connect method is called after an application requests a resource that is a remote resource.

The logic for managing the connection 318 saves state about the connection, and maintains that connection so long as at least one application is using the connection. In one example, the logic 318 saves a process identification for each process requesting the shared connection, and as each process releases or disconnects the connection, the state is updated. When the last process releases or disconnects the connection, the logic 318 allows the disconnection to occur, or allows a disconnection call to disconnect the shared connection. Additionally, the logic determines whether a running application has died or completed running without releasing the connection. Once all processes that requested the connection 308 have died, completed, or released the connection, the shared resource 308 is disconnected.

In the example where the device is a cellular (e.g., wireless) phone, example applications 320, 322 may include e-mail, a web browser, a camera, and/or voice services. In such a case, the network connection 308 is wireless, the network is a wireless telephone network, and the node 306 is a transmitter/receiver on the network. Of course, the wireless telephone network may also provide access to other resources or networks (e.g., Internet). Thus, existing networks provide many resources to applications once the described connection management logic is in place.

Exemplary Remote Access Connection

Figure 4:
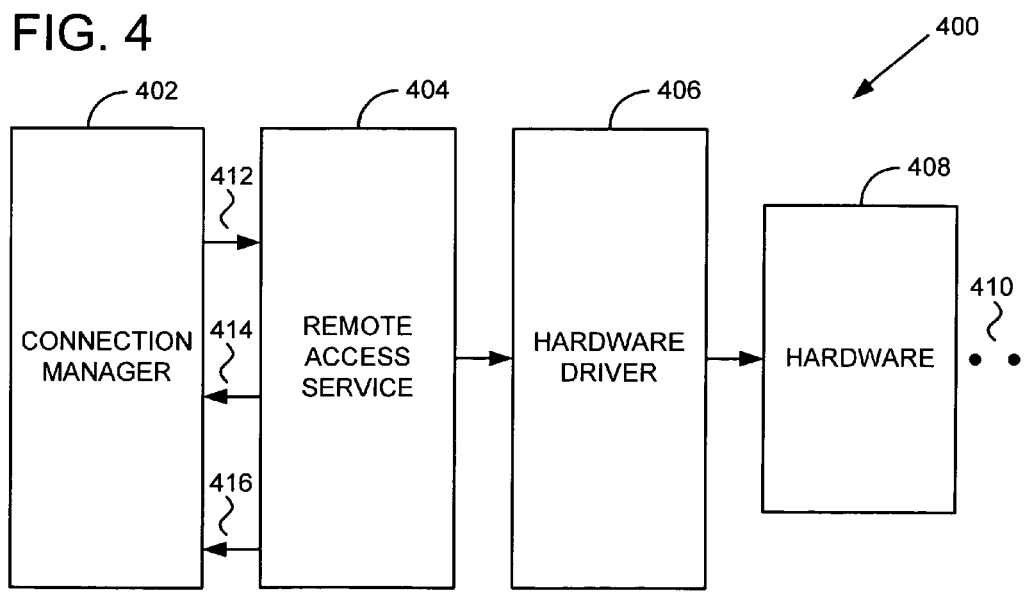
FIG. 4 is a block diagram of exemplary system components establishing a connection.

FIG. 4 is a block diagram of exemplary system components 400 establishing a connection. In this example, a device comprises a connection manager 402 (e.g., a dialer), a remote access service 404, a hardware driver 406, and an internal or external hardware component 408 for establishing and implementing a connection 410, wireless or otherwise.

A connection manager comprises software that receives connection or disconnection requests caused by applications requesting remote resources. The connection or disconnection request received by the connection manager is received from a method call by an application. In another example, the connection or disconnection request received by the connection manager is received by a system service that receives a resource request from an application. In one such example, after the system service determines that the resource is remote, the system service issues a connection request on the connection manager 402.

A connection manager assembles information (e.g., parameters) required to call a connection method (e.g., a dial method) on a remote access service 404. In an example, when the connection is a dial-up connection, the assembled information includes a telephone number and possibly an area code, a user identification, or a password. In other examples, the assembled information will include information about the quality or reliability of service (e.g., bandwidth) required for the requested connection. The types of information gathered are well known and varied for the different types of requested connections, whether wireless or otherwise. Once the information is assembled, the connection manager calls a method on the remote access service requesting a connection. The remote access service returns information to the connection manager. In one example, the returned information indicates connection status information such as whether a connection was established. In another example, if the connection is established, the remote access service also returns other status information about the connection (e.g., type of connection, dial-up, wireless, bandwidth, protocol, etc.). In one example, a connection manager stores the status information about the connection, and later the connection manager compares this information to determine whether certain actions (e.g., threshold based status responses) should be performed based on the stored status information.

In one example, when no connection is established, the remote access service returns status information to the connection manager. In one such example, the remote access service returns a standard code indicating why the remote access server was unable to establish a connection. Such standard codes are also referred to as error codes and are very numerous and diverse in nature (e.g., hardware failure, line busy, no dial tone, wireless service out of range, password incorrect, requested service not available, etc.).

A remote access service receives a connection request from the connection manager and invokes certain methods on a hardware driver to establish and maintain a connection. In one example, a remote access service invokes methods on a hardware driver according to a standard. For example, Unimodem is a driver standard for communications hardware (e.g., modems) interfacing with connection requests on Microsoft Windows platforms.

Often a hardware component 408 manufacturer writes a software program designed to communicate with the hardware component. This software is often called a hardware driver 406. The hardware driver receives method calls formed according to a standard (e.g., Unimodem) and forwards them to the modem where they are sent out over a medium 410 (e.g., a cable, dial-up connection, radio frequency, etc.). The hardware 408 transmits and receives communications with other remote hardware over the medium 410, according to a communications protocol. Thus, the hardware driver contains methods that it expects a remote access service to call according to a communications standard.

In the Microsoft Windows operating environment, the remote access service is the Remote Access Service software (i.e., RAS component) from Microsoft Corporation. Other devices not using the RAS component may create their own remote access service, and it would have a possibly different set of codes used to identify errors returned from a call to the remote access service.

For example, on an Apple MacIntosh platform, a remote access service is called Open Transport (OT), and OT hosts a separate known communications standard and error codes. In such an example, the connection manager assembles information and requests an OT connection accordingly, and receives OT error codes.

Exemplary Connection Status Information

A connection manager receives status information about connection requests 414, and about established connections 416. For example, if a remote access service is the Remote Access Service from Microsoft, upon a connection request, a connection request returns such errors as "602", indicating port is already open, "615", indicating port was not found, "638", indicating the request timed out, and etc. In another example, if a remote access service is Open Transport from Apple Computer, upon a connection request, a connection request returns such error codes as "7129", indicating that PPP authentication failed, "7139", indicating that OT/PPP cannot locate its preferences folder, etc. In another example, if a remote access service is Mobile Wireless Center from Cisco Corporation, a server request returns such error codes as "2001", indicating unable to log-in a device, "4008", feature does not exist, "0", indicating a successful operation, "4011", indicating server was unable to get telnetInfo, etc. Such various protocol error/status codes, wireless or otherwise, are well known.

Status information is returned upon a connection request. Status information is also received by a connection manager on an open connection without a request (i.e., pushed status information). For example, a RAS status indicates an unexpected disconnect (i.e., RAS "101"). Additionally, status information about a connection can be obtained by a connection manager. Thus, when status information is received by a connection manager, that status information is being received as a result of a connection request, as a result of another request made on a remote access service, or is pushed to the connection manager from the remote access service as associated with a prior established connection request or connection session.

Exemplary Status Count

Connection logic (e.g., a connection manager) maintains a status indicator count for plural status indicators. When status information is received by a connection manager, if that status information includes status information that corresponds with one or more of the plural status indicators being counted, the connection manager adds one to the status count for that indicator.

A data structure such as an array, a table, a linked list, or other type of data structure is used to associate status identifiers with a count value. For example, as shown in FIG. 5, a list 502 data structure includes a list of records 504, 506. Each record in the list includes a status identifier (e.g., RAS "676") and a count for that identifier (e.g., "2"). In another example, a status identifier is associated with an object property and/or an object method. For example, as shown, a phone number property 508 has an associated list of status identifier counts 510, 512. In another example, not shown, a dial ( ) method on a remote access service has an associated status record, and/or list of status records and counts for status identifiers received on a method.

In one example, when a connection manager receives a status indication, a count for that status record is incremented.

Exemplary Threshold Based Status Response

A connection manager (e.g., connection logic) provides certain behavior in response to determining that a threshold number of status information indicators have been received. In order to determine what behavior to perform, a connection manager has access to a data structure. The data structure identifies what action/behavior to perform upon determining that a threshold number of indicators have been received for a given status. A threshold based status response (TBSR) data structure can be provided in the form of an array, a table, or other data structure. Additionally, a method may also contain a switch that calls other methods based on status identifier and threshold count input parameters. A state machine would also provide the desired TBSR behavior.

FIG. 6 is a diagram of an exemplary table data structure of a threshold based status response. As shown, a status column 602 identifies a status, a threshold column 604 identifies an associated threshold number of status indicators for each status, and an action column 606 identifies an action associated with a status threshold combination. In this example, if a "602" RAS error code is received by the connection manager fewer than three times, no action is required. On the third occurrence of a receiving a "602" identifier, the connection manager calls a 602A( ) method. In another example, the table indicates a same method to call 608 when any of the three status identifiers (i.e., X, Y, Z) reach a threshold count of seven. Finally, plural status codes 610, plural thresholds 612, and/or plural actions may be provided in table row cell associations. Upon any combination of status code 610, threshold match 612, one or more actions or methods may be indicated 614 and thus taken, or no action at all 616.

Exemplary TBSR State Machine

Figure 7:
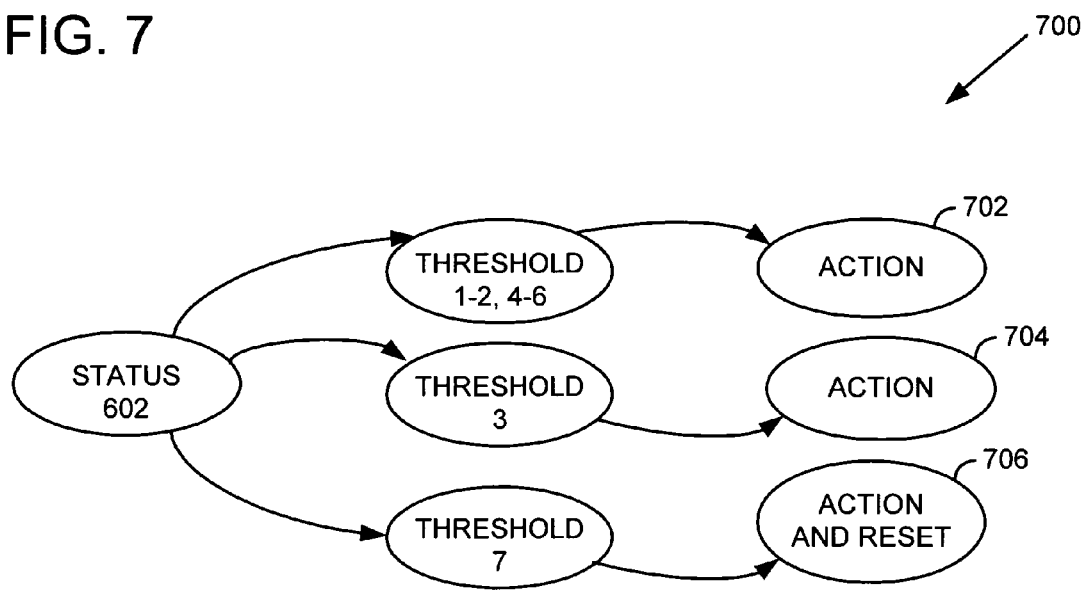
FIG. 7 is a diagram of a threshold based status response state machine.

FIG. 7 is a diagram of a threshold based status response state machine. In this example, a state machine 700 determines the threshold based status responses. In this example, for threshold values 1-2 and 4-6 on status 602, action 702 is taken. On threshold 3, action 704 is taken, and on threshold 7, action, 706 is taken, and then the count on the "602" identifier record 316 is reset. Of course, a reset of any record identifier could appear within the method called from the table (e.g., 608).

Figure 8:
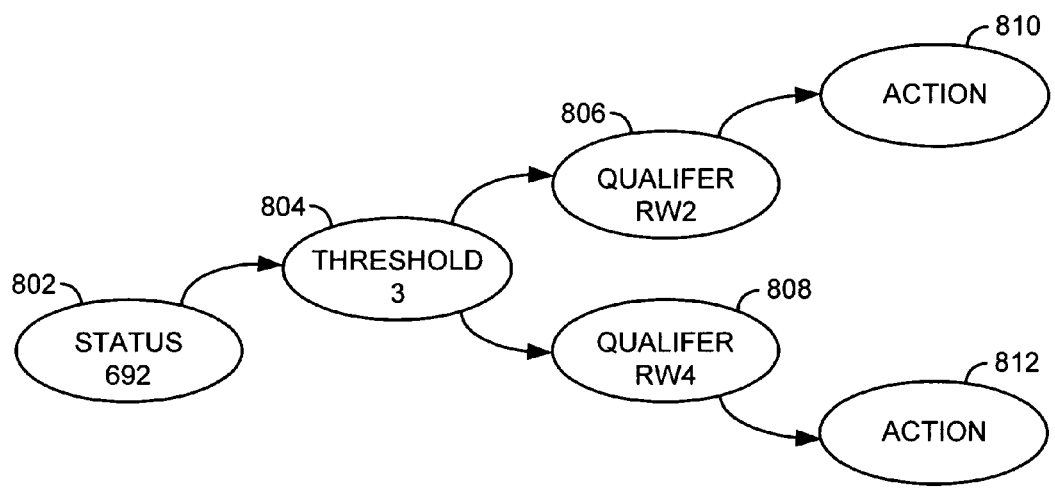
FIG. 8 is a diagram of a threshold based status and qualifier response state machine.

FIG. 8 is a diagram of a threshold based status and qualifier response state machine. The value of adding a qualifier to the state machine (or a qualifier column to a table 600) is in providing further granularity on corresponding responses.

For example, if a status "692" is received 802, a threshold number of times 804, then a first action 810 is performed for one type of modem chip 806, and a second action 812 is performed for another type of modem chip 808.

Thus, qualifiers are used to provide a greater range of actions based on other conditions (e.g., hardware/software platform, network environment, etc.). In another example, qualifiers are used in a TBSR Table by adding additional columns (not shown) to the table 600.

Exemplary Connections

In one example, a client 200 is a personal computer and an application 202 is an Internet browser. A user opens the browser application and types www.espn.com into the address location. This begins a process of obtaining an Internet connection.

Figure 9:
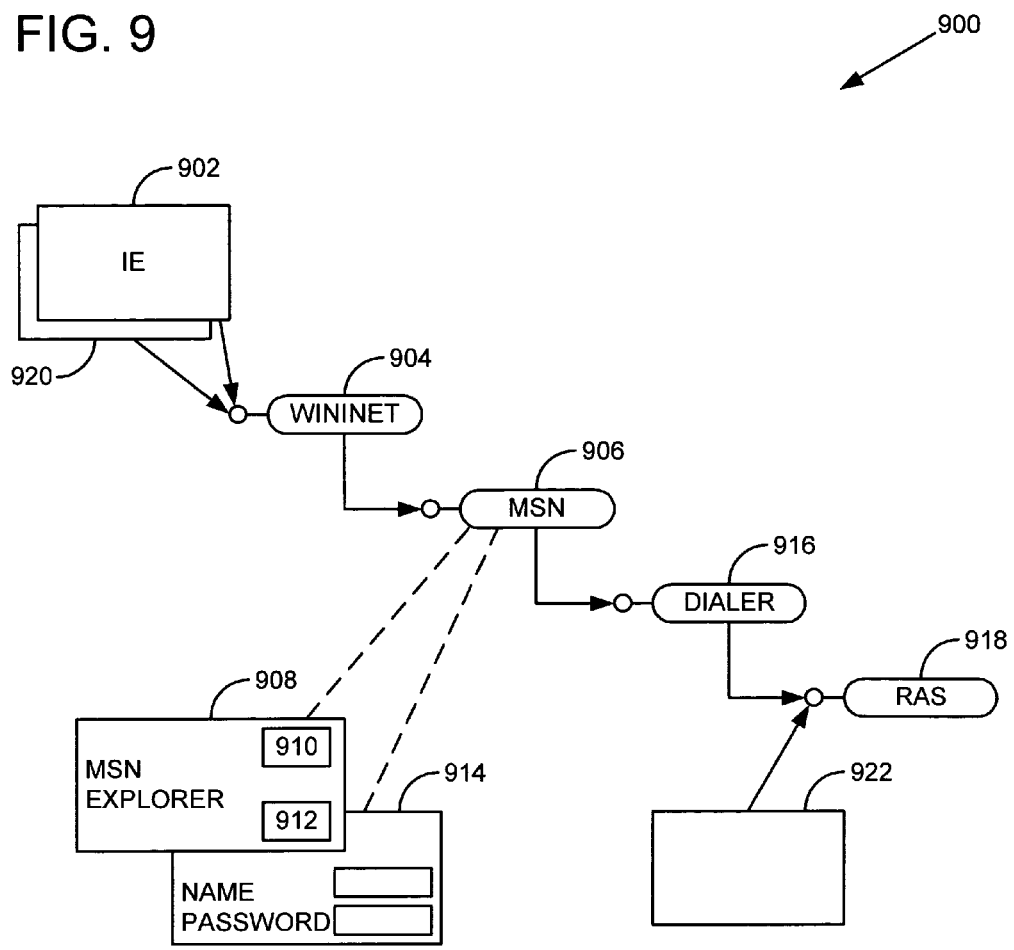
FIG. 9 is an exemplary block diagram of software components involved in establishing a connection to a remote resource.

FIG. 9 is an exemplary block diagram of software components involved in establishing a connection to a remote resource. In this example, an application requesting network access is the Internet Explorer from Microsoft Corporation 902. If a user attempts to access a web server on the Internet (e.g., www.espn.com), the application requests the web server, and a Microsoft Windows operating service component called "Wininet" 904 determines whether an Internet connection is established. For example, if the computer was already connected on a local area network, then no network connection needs to be established. However, in this example, since no connection is yet established, and Wininet determines that the computer is set to use a dial-up connection, Wininet invokes a Default Dial up networking component which invokes the MSN Explorer component 906, which generates a window 908 that includes user identification tiles 910-912, and a window 914 for obtaining identification/authentication information. The MSN Explorer component 906 calls a dialer component 916 (e.g., Connection Manager) to established a pipe to the remote ISP server. Once the pipe is established with the ISP, the application 902 can communicate with a remote resource (e.g., the web server www.espn.com).

The Connection Manager component uses a remote access server component (RAS) 918 to establish the pipe with the ISP. The RAS component dials up the ISP over local telephone lines. On the ISP, another server receives the telephone call and authenticates the call with a software component called a Network Authentication Server (NAS), not shown.

When the Connection Manager component asks RAS to provide a connection, it provides RAS with parameters such as the number to call at the ISP, credentials required to complete the connection, and other parameters defining the requested connection. The RAS component returns a handle to that session which includes a ticket to identify the session.

When the application has completed the session using the established pipe, the application 902 calls disconnect (e.g., InternetAutoDialHangup( )) on Wininet 904.

Later, when this or another application requests connection to a remote resource, these same components are used to create a pipe to the ISP.

When an application requests access to a remote resource, Wininet either allows access to established communications (e.g., a LAN, or a pipe), or blocks activity until the connection is established as described above.

As data is received on the pipe intended for one of the applications, it is directed to that application. In the case of TCP/IP, Wininet assigns a communications port to each application, and packets sent and received via that port are directed to the corresponding application. This protocol specific information is known in the arts for the different types of networks, wireless or otherwise.

In another example, an application 922 requests a connection directly from the RAS component 918. In this example, the dialer component 916 is registered as a custom dialer (e.g., registered as a component in a system registry) in the registry. In this case, the RAS component consults the registry and requests the dialer to perform the dialing function. The dialer would establish the telephone connection via RAS, and RAS returns a handle to the dialer, and the dialer returns a handle to the calling component. This handle is used by the component to communicate over the connection.

There are many diverse ways that requests are generated for remote resources. Since these resources are remote, a communication pipe is established to one or more remote computers. Often a dialer is used to assemble the content required to populate the input parameters on a call to a RAS component.

In one example, a connector component assembles the data required to invoke a dial function on a RAS component.

Exemplary Connection Manager Components

Figure 10:
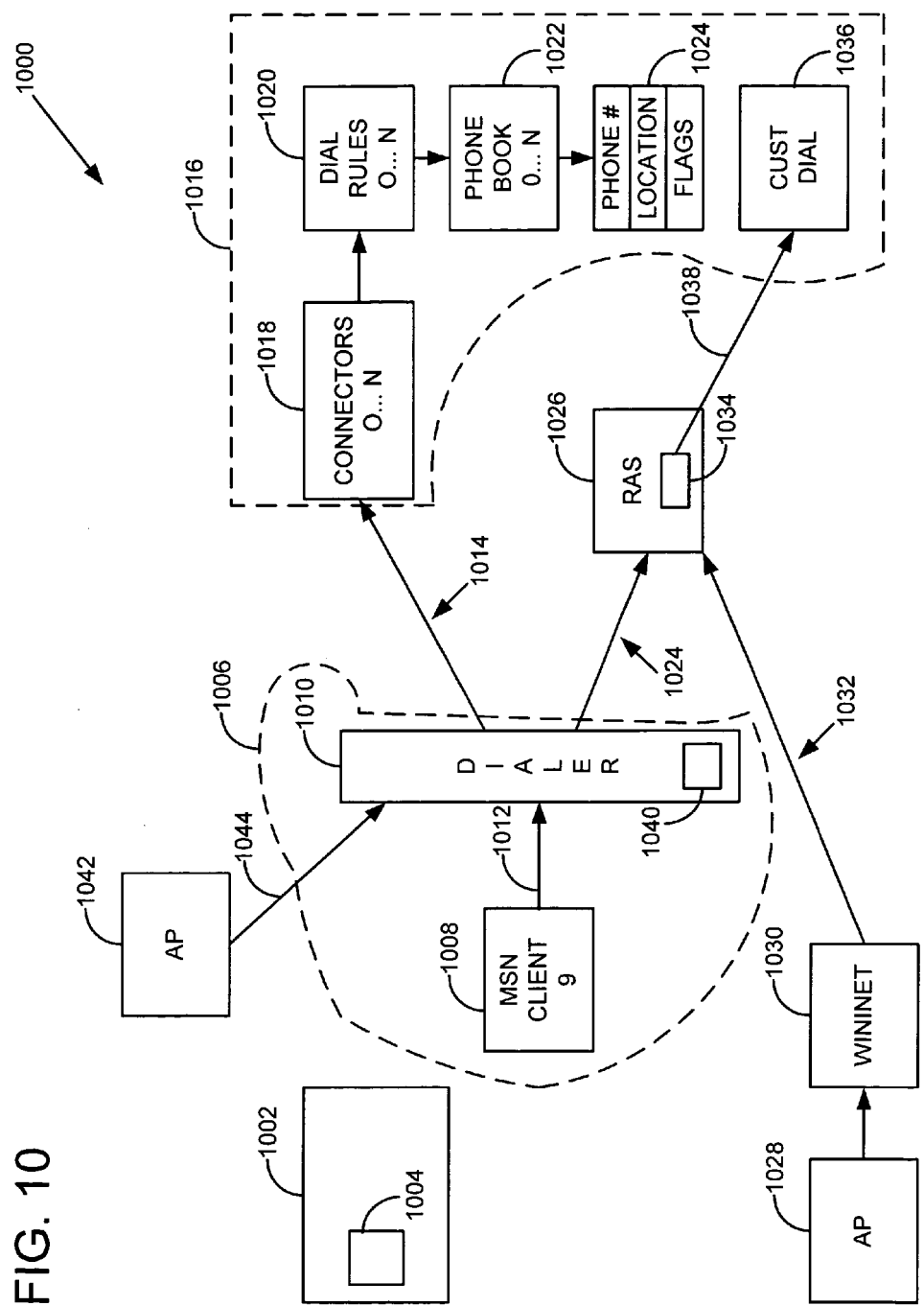
FIG. 10 is an exemplary block diagram showing a system of components involved in managing a shared connection.

FIG. 10 is an exemplary block diagram showing a system of components 1000 involved in managing a shared connection.

In a first example, a computer user clicks on a screen 1002 icon 1004 representing an Internet connection (e.g., a butterfly icon representing a Microsoft Network client). Clicking this icon causes the computer to load the Microsoft Network Services version 9 (MSN 9) environment 1006, including a user interface software component called an MSN 9 client 1008, and a dialer component 1010. Next, the MSN 9 client 1008 displays the user "files," and if a clicked file represents a dial-up user, the MSN 9 client will call a connect( ) method 1012 on the dialer component 1010 (e.g., Connection Manager). In this example, the dialer component exposes a connection( ) method via the "Dialer COM" interface.

In one example, data for a connection is obtained by a connection manager from a data store. In one such example, a dialer component calls a method 1014 on a registry 1016 to identify a connector. In many computer systems, a system service is provided to programmers for storing, altering, and obtaining information and programs in a system registry. In this example, the registry contains one or more ("n") connectors 1018 that can be used to establish a connection to the network. The registry connector 1018 contains a data property known as the "current connector." Each connector (i.e., 0 . . . n) includes a set of rules 1020 (e.g., "disable call waiting," "dial 9 for outside line," etc.) which should be used for that current connector. Additionally, the connector component calls a phone book component 1022 to identify a phone number for that current connector, and each phone number includes the number to dial, a geographic location such as "Atlanta" or "New York," and flags that indicate whether the number should be dialed using an area code prefix, and/or the number "1" before the prefix for long distance. The information gathered at the dialing rules 1020, the phone book 1022, and the phone number flags 1024, is used to assemble a number sequence to dial for the current connection. This information is returned to the dialer as a result of the connector call 1014. Optionally, the registry also returns that users name and password from the connector call 1014. This information is passed back to the dialer.

Next, the dialer component 1010 calls a dial method 1024 on a remote access service 1026 (e.g., a RAS component). The dial call 1024 includes parameters comprising the numbers required by a RAS component to establish a connection (e.g., phone number, password, prefix, etc.). The RAS component 1026 returns a "HRASCONN" handle to the dialer component 1010. This HRASCONN handle becomes the ticket used by the dialer to refer back to the connection, for example to disconnect the connection. The return from the dial call 1024 can also contain other information, such as error codes (e.g., connection not established, invalid user name or password, etc.). Thus, the HRASCONN handle holds state regarding the status of the connection (e.g., bytes-up, bytes-down, bit rate, etc.).

When the application is finished using the connection, the MSN 9 client 1008 calls disconnect on the dialer component 1010, and the dialer component calls a disconnect method 1024 on the RAS component.

In a second example, an application 1028 requests access to a remote resource. This request triggers a call on the RAS component 1026 either directly, or through a series of calls, for example, as discussed with respect to FIG. 9. In such an example, the application directly, or through WININET 1030 will determine how RAS is configured 1032 to connect to the Internet. For example, in a Microsoft Windows operating environment, if a registry configuration indicates dial-up access, and a Default Dialup connection 1034 is set to the MSN connectoid, then the registry 1038 will indicate that a "custom dialer" 1036 should be used to establish the connection. In such an example, when RAS calls a connect on the connectoid 1034, the connectoid will call a method on the registry 1038 and identify the custom dialer called "CUSTDIAL.DLL." A method in the "CUSTDIAL.DLL" called "RASCUSTOMDIAL( )" determines whether the MSN 9 client 1008 is installed on the computer by checking the registry. If the MSN 9 client 1008 is installed on the computer, then the connection proceeds as discussed in the first example. Thus, applications requesting connection from the RAS component are directed back through the dialer to implement the shared connection technology. In such a case, the MSN 9 client will be loaded and run starting from the "tiles," as discussed in the first example.

If the MSN 9 client is not installed on the computer, then the "RASCUSTOMDIAL( )" method will bypass the MSN 9 client 1008, and pass the connection request directly to the dialer component 1010, as otherwise discussed in the first example. Thus, in these two examples a connection request goes through the MSN 9 client 1008, or is redirected to the dial component via CUSTDIAL 1036.

When the application 1028 has completed use of the remote resource, the application will call disconnect on the RAS component, either directly or indirectly through WININET 1030. As before, the disconnect will be redirected via the custom dialer 1036 to the dialer component 1010.

Thus, some applications are designed to call a RAS interface which results in the dialer component being invoked via the "RASCUSTOMDIAL( )" method of registered "CUSTDIAL.DLL," while other applications utilize the MSN 9 client which invokes the dialer component directly.

Finally, an application 1042 can also request 1044 a connection or disconnection directly from the dialer component by calling the connection/disconnection method described above as exposed by the Dialer COM interface.

In the described scenarios, connection and disconnection requests are directed to the dialer component which contains logic 1040 for managing the connection.

Exemplary Connector

In one example, a device includes a connector component. The connector component is a set of parameters that are provided to a dialer on a connection call. The parameters tell the dialer what phone number to call, how to dial the phone number, what hardware component (e.g., modem) to use, dialing properties (e.g., "9" for outside line, etc.), what credentials to use (e.g., user, device, etc.), and what parameters to input into the API for the dialer (e.g., configuration information). It includes the information needed to establish the connection 308 that is later shared when requested by a second application.

The connection information is saved in memory (e.g., stored in the registry), and when a connection is requested, the connector is used to tell which information to use to dial and create the connection. Further, in cases where one connection fails, the connector contains the "next best" connector information for a dialer to try.

In one example, the connector is implemented by a dialer component and is invoked by the dialer in order to obtain configuration information for requesting the connection.

Exemplary Connector Data Storage

As previously stated, in one example a connection manager (e.g., dialer component) assembles information for input to a remote access service connection request. A previous example provided this information via a system registry. However, in another example the information is provided via a database, a file, or other data structure. In one such example, the information is provided as an XML file. For example, in the Apple MacIntosh platform, the information is stored in an XML file.

Figure 11:
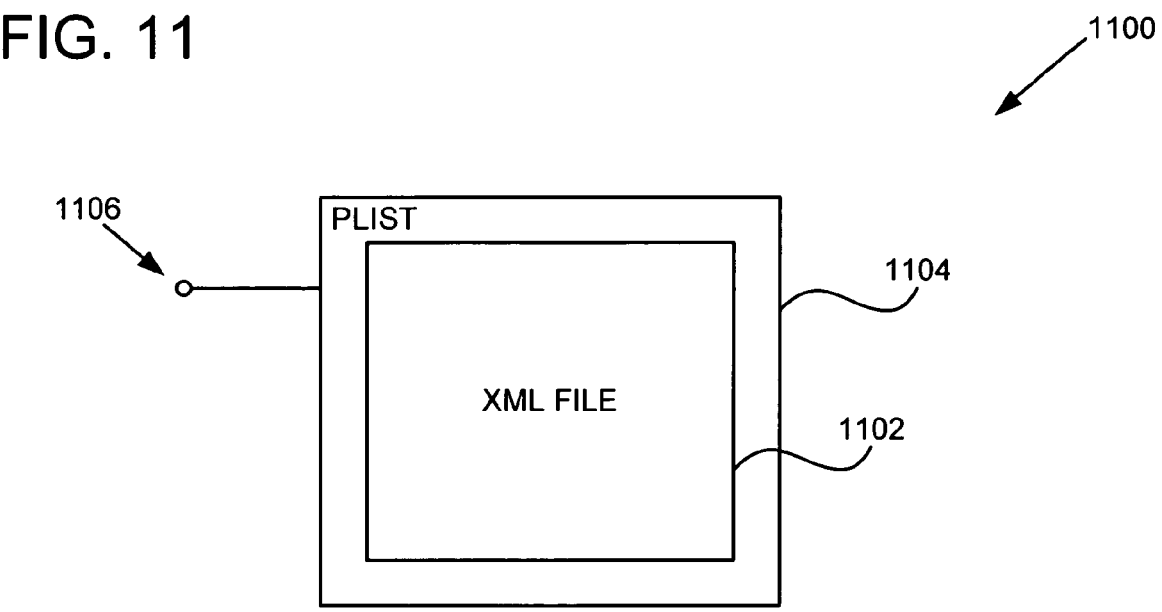
FIG. 11 is a block diagram of an XML file for storing connector information.

FIG. 11 is a block diagram of an XML file 1100 for storing connector information. The XML file 1102 comprises a schema for defining data properties stored in the file.

A programmer creating a connection manager stores, updates, and obtains information associated with configuring a connector in the XML file. The schema is used to create methods that traverse or parse the XML file and store, update or obtain information required to issue a connection call on the remote access component, and maintain the features discussed.

In one example, a MacIntosh platform exposes an interface used by programmers to store and access files associated and including their programs.

The interface is called a PList 1104, in XML, and has interfaces 1106, that the connection manager calls into to manage connector information. For example, the connector 1018, the dial rules 1020, the phone book 1022, and the location 1024 are accessible via the PList interface 1106 on the MacIntosh platform.

Thus, the connector information is stored in an XML file for access as needed by a connection manager.

Exemplary Threshold Based Method

Figure 12:
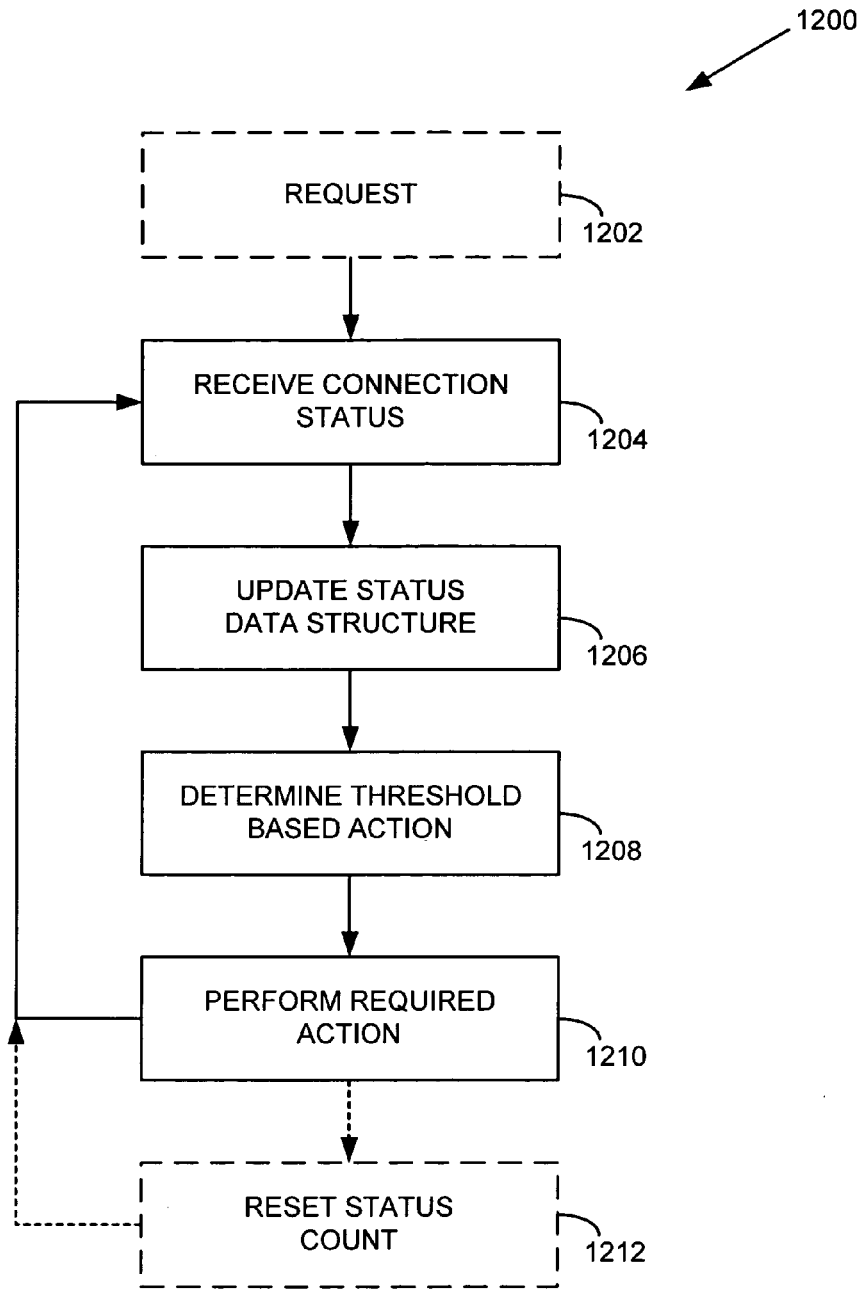
FIG. 12 is a flow chart for an exemplary method for threshold based connection status response.

FIG. 12 is a flow chart for an exemplary method for threshold based connection status response.

At 1204, the method receives status data about a connection. The received data is data about an established connection to a remote resource, data returned from a connection request, and/or data requested from a remote access service (e.g., connection bit rate request). Step 1202 is optional since status data is pushed to the method without the method's request in some cases (e.g., RAS error code "101" connection dropped).

At 1206, status data received at 1204 is counted when the method increments a status identifier count in a status data structure.

At 1208, the method determines a threshold based status response (i.e., action). For example, the method determines that a counted status identifier has a corresponding threshold value in a threshold response data structure.

At 1210, the method performs the determined action. Optionally, a response or action may include a final step of resetting a status identifier record count. Whether or not a status count is reset, the method may continue while the connection is open or being requested.

In one example, a method requests a connection 1202 on a remote access service. The method receives 1204 a no answer status code from the remote access service, and updates 1206 a status data structure by incrementing a busy signal count 314. The method then accesses a TBSR table and determines 616 a method to perform 622 on a first occurrence of no answer (e.g., call "678( )"). For example, the 678( ) method may disable this "no answer" number 318 in the phone book for this dialing session. Other actions may include counting "no answer" or "busy" status codes until the third occurrence, and then to disable this phone number from the phone book.

In one example, a connection manager uses this method 1200 between connection requests. In one such example, after the connection manager records a busy signal 314, it rolls to the next phone number in the phone book, or to the next connector in the connector object 310, and then tries again to establish the connection. In this regard, the connection attempts for a dialing session are recorded in the status data structure as received for each phone number or connector parameter properties. Further, in another example this information is recorded in status records for multiple sessions, and phone numbers, connector properties, dialing properties, etc., are recorded and compared to threshold values in order to perform actions and behaviors indicated in a TBSR table intended to improve user experience. In one such example, these status codes are counted over plural dialing sessions. In such a case, a threshold response will provide behavior that alters a connection manager's behavior over plural sessions. In one such example, if a phone book number is busy three times over five sessions, that phone number is disabled, thereby improving a user experience.

Exemplary TBSR With Updates

Figure 13:
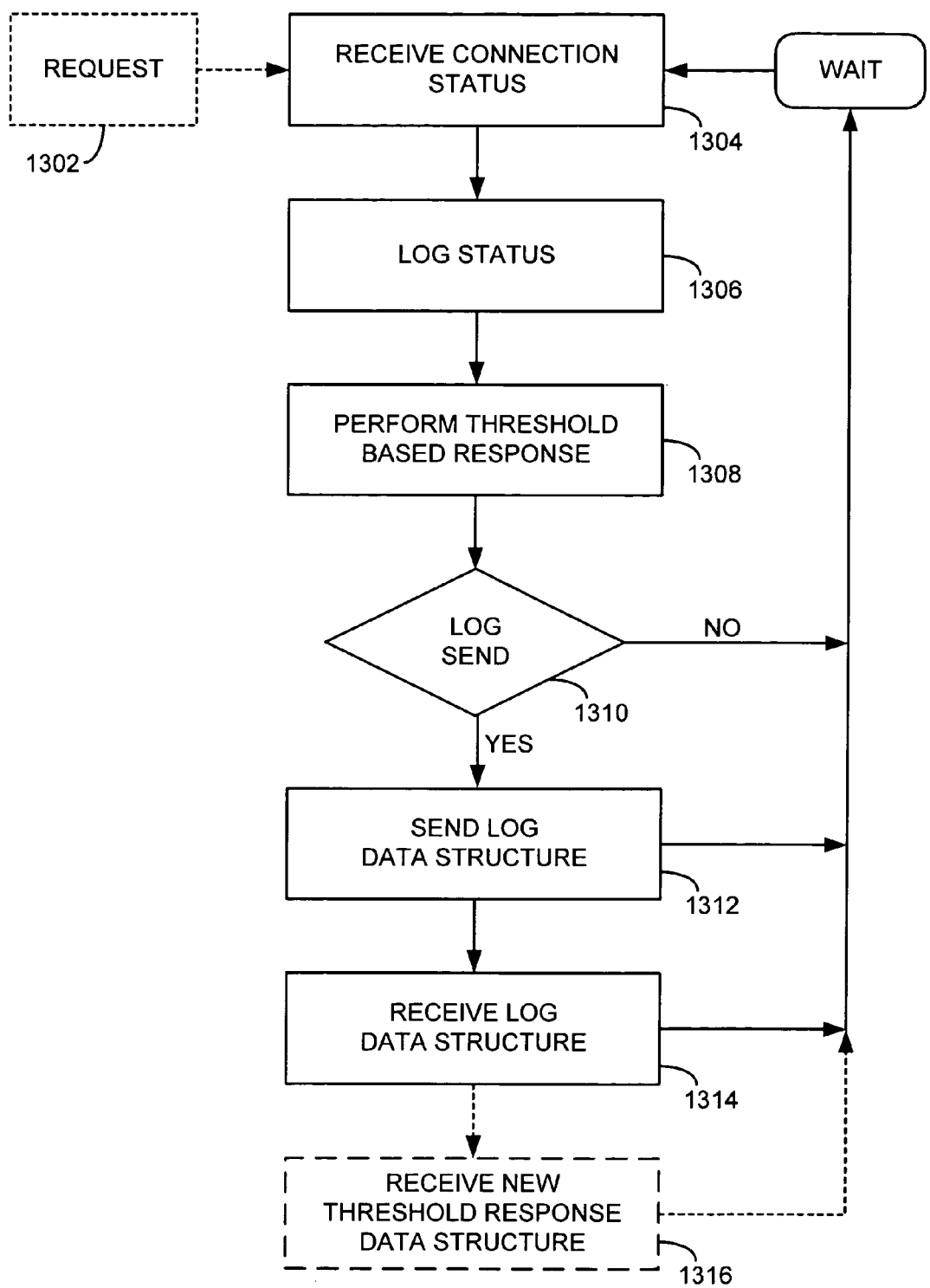
FIG. 13 is a flow chart of an exemplary method of threshold based connection status response with a status data structure update.

FIG. 13 is a flow chart of an exemplary method of threshold based connection status response with a status data structure update.

At 1304, a method receives a connection status. Optionally, the received status was in response to a request 1302 made by the method.

At 1306, the method increments a connection status count in a status record.

At 1308, a threshold based status response is invoked based on a response determined in a threshold based status response data structure.

At 1310, determine whether it is time to send status record counts to a remote server. The logged status record count (e.g., a status data structure or representation thereof) is sent 1312 to a remote server periodically, every successful connection, every 20 connection sessions, every week upon a request received from a remote server, etc. In another example, the record is sent upon request of a remote server.

At 1314, receive a new status record (e.g., a status data structure) for future status recording purposes. The received data structure is returned in response to the sent 1312 data structure in one example, although this is not required. A new log data structure can be pushed/posted to the method during any session, and at any time during the connection session.

Optionally, the method receives 1316 an updated or new threshold based status response data structure. This updated TBSR contains one or more new or altered actions, one or more new or altered thresholds for a status, and/or one or more new status codes with associated thresholds and actions.

In the case of an updated status data structure or TBSR, the method begins using these updated data structures, properties, and methods when logging future status data received 1306 and when determining and performing responses 1308.

Exemplary Connection Request and TBSR

Figure 14:
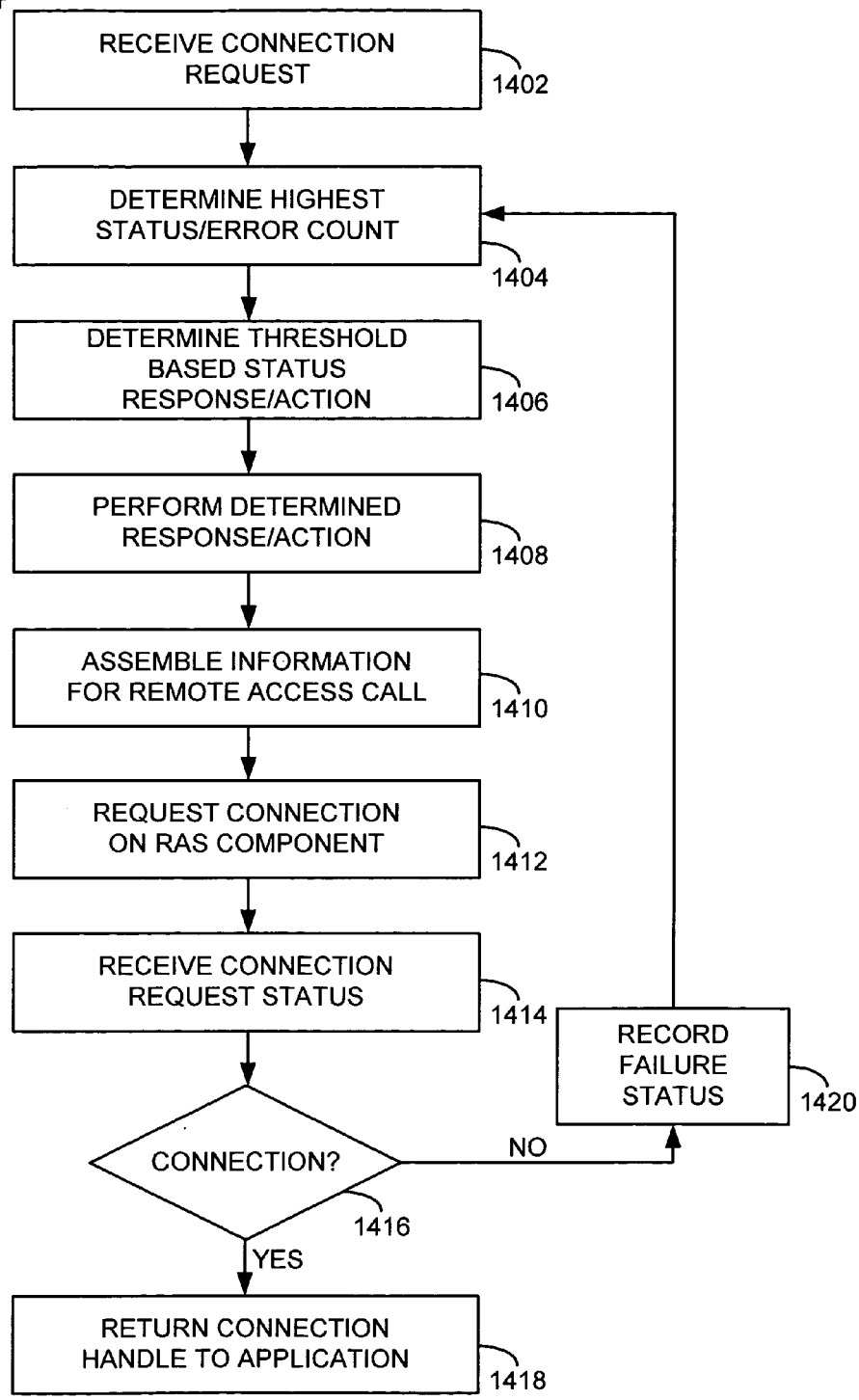
FIG. 14 is a flow chart of an exemplary method of performing a threshold based connection status response including connection requests.

FIG. 14 is a flow chart of an exemplary method of performing a threshold based connection status response including connection requests.

At 1402, a method receives a connection request from an application.

At 1404, the method accesses a status data structure to determine a highest status code count. In one example, a status code count is a count of the number of status codes returned on prior connection requests made by the method in this and prior connect request sessions. In another example a status code count also includes a count of status codes pushed to the method (i.e., as opposed to a status code received in response to requests) in this or prior connection sessions. In the examples discussed for FIG. 5, a status code is associated with a property, method, phone book, and/or a connector. In one example, the highest status count of all such data structure codes is returned along with the number of times that the status indicator was counted (e.g., 512).

At 1406, the method determines a threshold based status response 620 corresponding with the highest status code (e.g., "3") and identifier (e.g., "678").

At 1408, the method executes the determined threshold based action 620. In one example, the threshold based action changes the properties or methods of the data structure at the highest threshold location. For example, the highest threshold "3" is associated with a RAS code for no answer "678", and the performed action disables the telephone number 508 associated with the highest threshold status code 512. Thus, local self-healing is performed in response to a determining threshold for a status code. A flag (e.g., 1024) in the phone book is set to disable this number. If desirable, the method 620 resets the status count 512 to zero.

At 1410, the method obtains properties (e.g., input parameters) required for a connection request on a remote access service (e.g., a dialing sequence and/or other input parameters for a dial method call). In one example, the method obtains a telephone number from a phone book. In one such example, a telephone number that would otherwise next be dialed, is not dialed because a flag or other property associated with that telephone number indicates that it is disabled.

At 1412, a connection method (e.g., dial ( )) request with associated input parameters is called on a remote access service.

At 1414, a response to a connection method request is received from a remote access service. The response comprises connection information. In one example, the connection information is a status code (e.g., RAS/OT error codes).

At 1416, if connection request is successful, go to 1418, otherwise record a status code 1420 in a status data structure and return to 1404.

At 1418, since a connection is made, return a connection handle to the entity that was requesting the connection above at step 1402.

Exemplary TBSR on Five Status Codes

Figure 15:
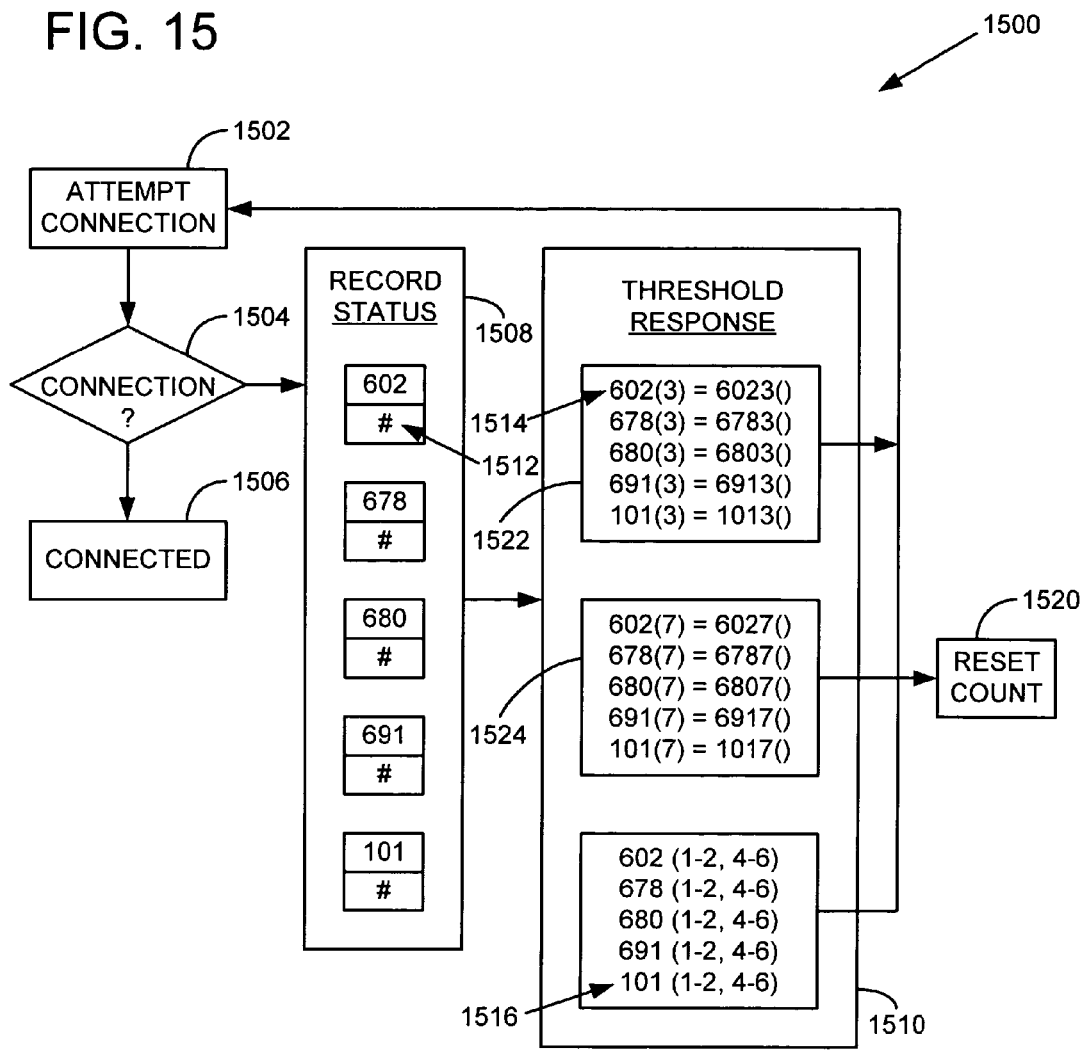
FIG. 15 is a flow chart of an exemplary method for threshold based status response for five status codes.

FIG. 15 is a flow chart of an exemplary method for threshold based status response for five status codes. As shown, a method 1500 provides threshold based responses for five RAS codes (e.g., 602, 678, 680, 691, and 101).

At 1502, a method attempts a dial-up connection. The method calls a dial( ) method on a RAS component of Microsoft Corporation.

At 1504, the method determines whether or not the dial request resulted in a connection 1506. For example, the connection request returns a success code indicator or method call output.

At 1508, since no connection was created, the dial method returns an error code which is recorded in a status data structure.

At 1510, the method determines whether a threshold response has been reached, and calls any associated method. For example, if status 602 has a threshold value of 3 (e.g., 1514), then method "6023( )" is called by this method, and then this method returns to try connecting again 1502. In this example, upon a threshold of "3", the five selected RAS error codes have methods identified as 6023( ), 6783( ), 6803( ), 6913( ), and 1013( ). In this example, upon a threshold value of "7", the five selected RAS error codes have methods identified as 6027( ), 6787( ), 6807( ), 6917( ), and 1013( ). In this example, for all other thresholds 1516 for the selected RAS error codes, the method provides no additional behavior and returns to try another connection attempt.

Figure 17:
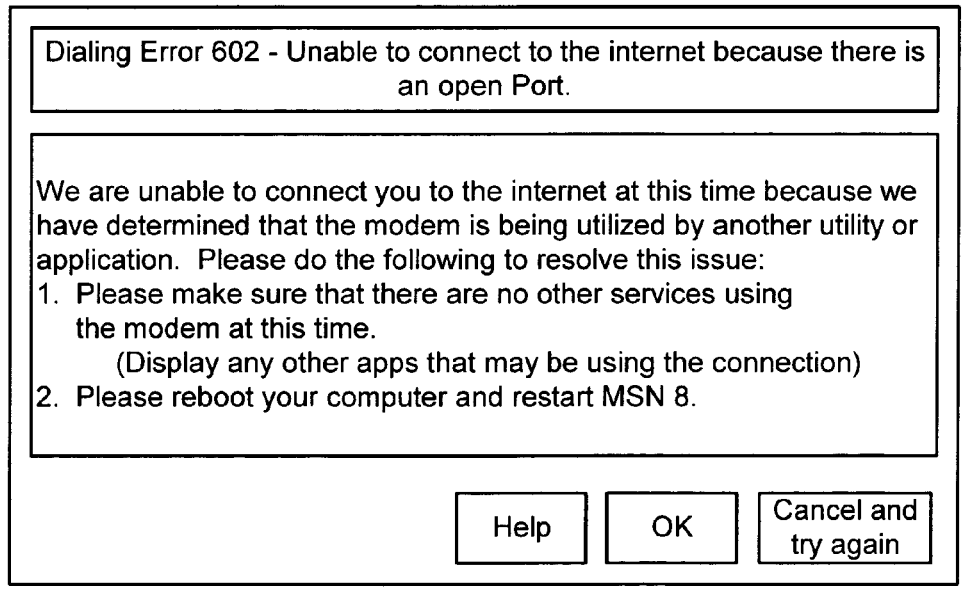
FIG. 17 is a diagram of an exemplary window requesting human interaction for a port error.

In one such example, upon reaching a "602" status count of "3" over one or more dialing session(s), the method determines 1510 that a threshold response requires displaying a graphical window as shown in FIG. 17.

Figure 18:
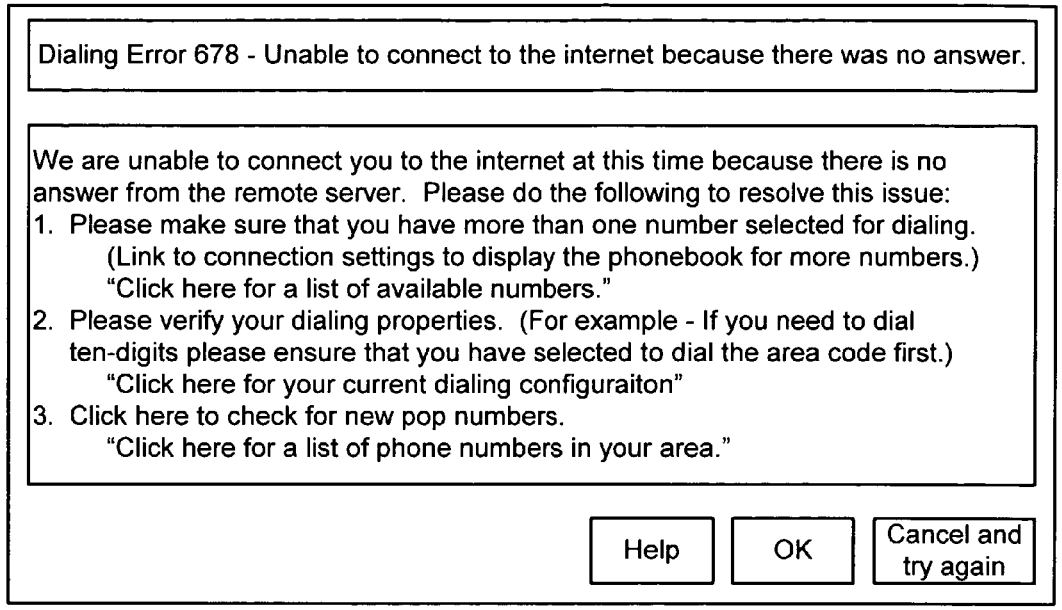
FIG. 18 is a diagram of an exemplary window requesting human interaction for a no answer error.

In one such example, upon reaching a "678" status count of "3" over one or more dialing session(s), the method determines 1510 that a threshold response requires displaying a graphical window as shown in FIG. 18.

Figure 19:
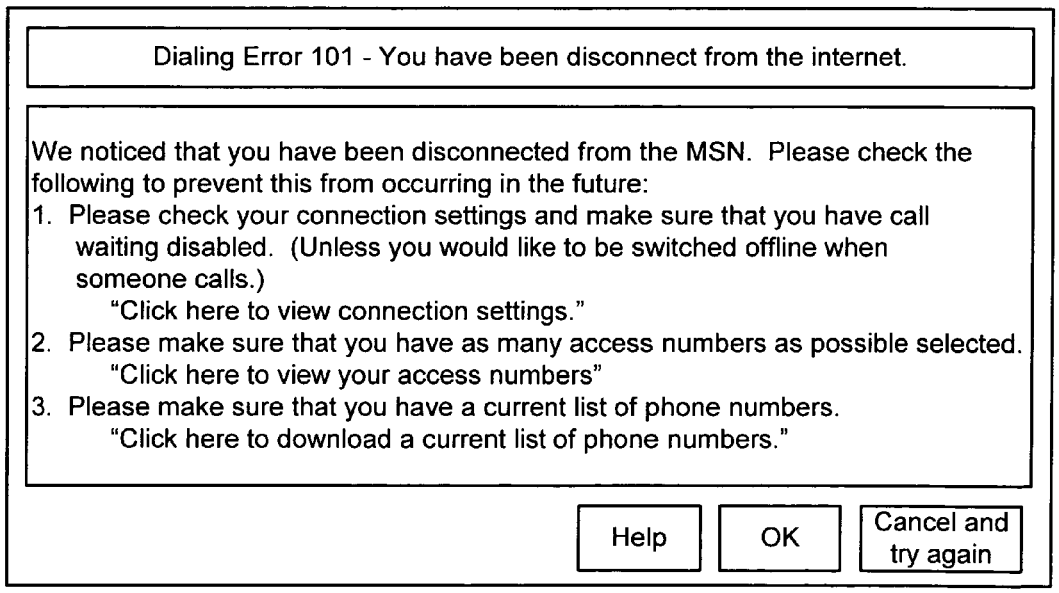
FIG. 19 is a diagram of an exemplary window requesting human interaction for a disconnect error.

In one such example, upon reaching a "101" status count of "3" over one or more dialing session(s), the method determines 1510 that a threshold response requires displaying a graphical window as shown in FIG. 19.

Figure 20:
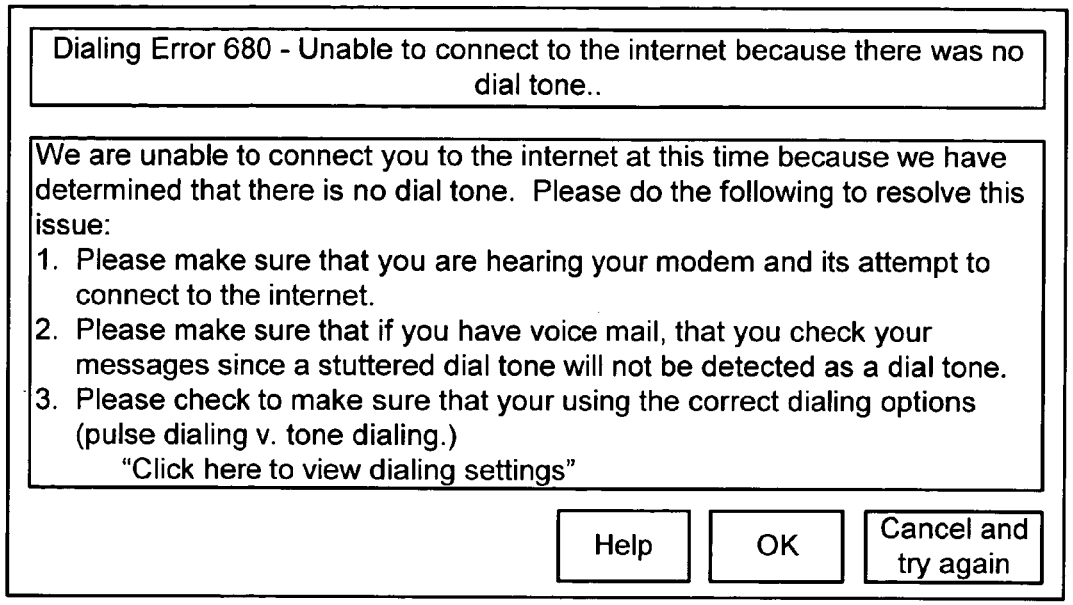
FIG. 20 is a diagram of an exemplary window requesting human interaction for a no dial tone error.

In one such example, upon reaching a "680" status count of "3" over one or more dialing session(s), the method determines 1510 that a threshold response requires displaying a graphical window as shown in FIG. 20.

Figure 21:
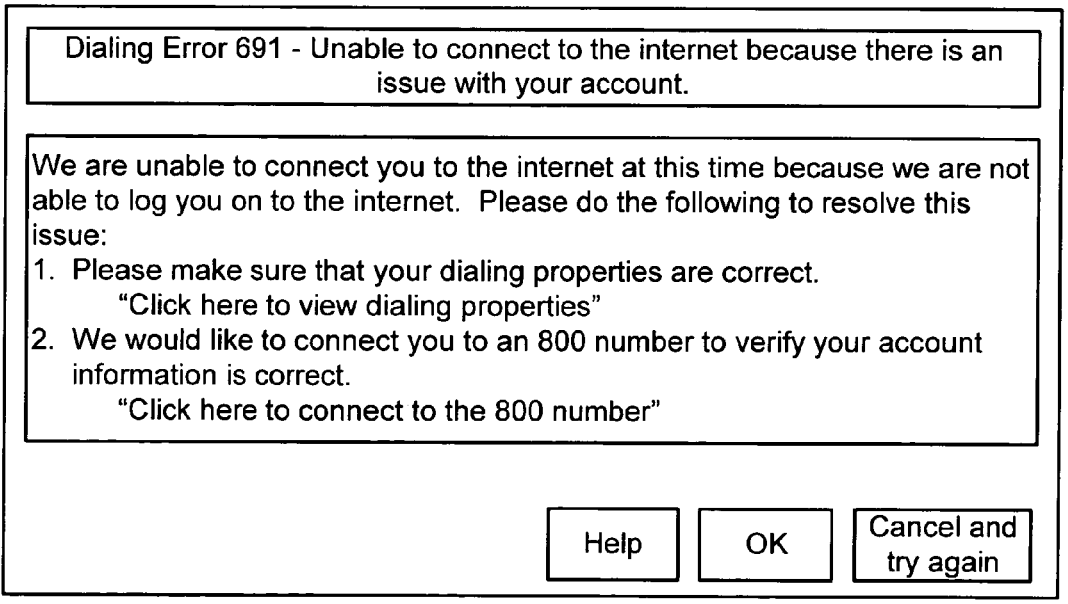
FIG. 21 is a diagram of an exemplary window requesting human interaction for account issues.

In one such example, upon reaching a "691" status count of "3" over one or more dialing session(s), the method determines 1510 that a threshold response requires displaying a graphical window as shown in FIG. 21.

In one such example, upon reaching a "678", "602", "101", "691", or "680" status count of "7" over one or more dialing session(s), the method determines 1510 that a threshold response requires displaying a graphical window (not shown), that directs the customer to contact customer support via telephone or otherwise. Thus, this example proves a two threshold solution to resolving a user's connection problems. The first phase 1522 provides graphical suggestions directly to the user to solve the problem, and the second phase 1524 provides a user with contact information for resolving the problem.

Additionally, in several discussed examples, since status data structures such as 1508, 1512 are sent to a remote server, that information is available to a customer service representative to help understand the operating environment and to help provide clues to resolving connection.

As other RAS errors have behaviors (e.g., threshold based responses) provided, that behavior is provided when data structures are added (e.g., 1512) and/or when thresholds and corresponding methods are added (e.g., 1514) to the method 1500. Thus data structure and threshold method updates are periodically sent to a connection manager on the device, and the connection manager updates the existing data structures or replaces them completely with new ones.

Exemplary TBSR Dialogue Windows

As previously discussed, methods perform actions attempting to improve efficiencies when threshold status indicators are determined. Preferably these actions perform executable instructions that alter program behavior dynamically according to a TBSR data structure and without human interaction. However, sometimes it is necessary to involve a human in a self-healing process. In such cases, an action 606 includes a pop-up or dialogue message requesting human help. For example, a window may instruct the user to reset the computer or return the telephone handset to the phone on the dial-up line in order to obtain a dial tone.

Figure 16:
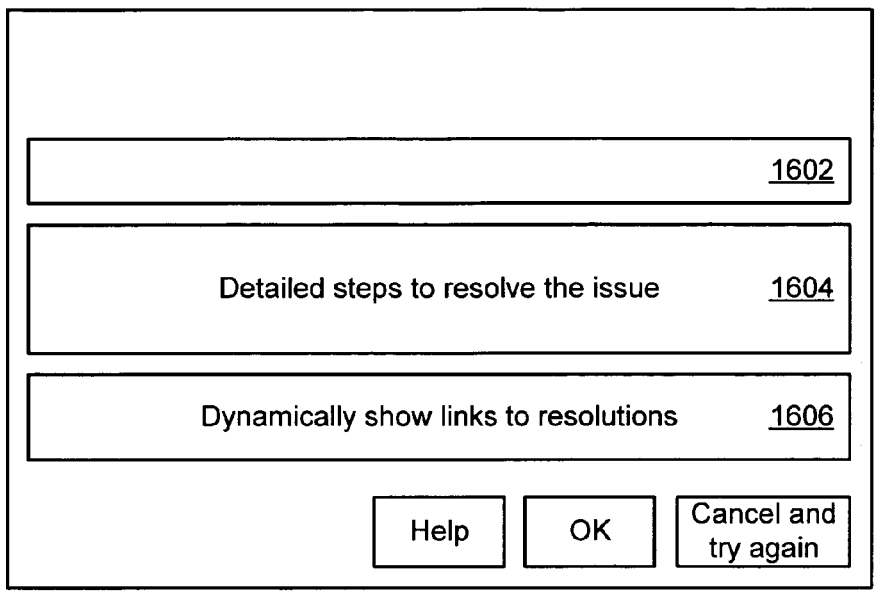
FIG. 16 is a diagram of an exemplary graphical window intended to involve a human in responding to a status code.

FIG. 16 is a diagram of an exemplary graphical window intended to involve a human in responding to a status code. As shown, the window includes text and/or buttons. Text may include a description of the status condition 1602, steps that may solve the problem 1604, hypertext links to knowledge articles or instructions 1606 about the problem, and/or buttons to solve and/or retry a desired behavior.

FIG. 17 is a diagram of an exemplary window requesting human interaction for a port error. In this example, a window is an action 1510 (e.g., 602(3)=6023( ) ) in response to a threshold "3" count on a RAS ("602") port error.

FIG. 18 is a diagram of an exemplary window requesting human interaction for a no answer error. In this example, a window is an action (e.g., 678(3)=6783( )) in response to a threshold "3" count on a RAS ("678") no answer error.

FIG. 19 is a diagram of an exemplary window requesting human interaction for a disconnect error. In this example, a window is an action (e.g., 101(3)=1013( )) in response to a threshold "3" count on a RAS ("101") disconnect error.

FIG. 20 is a diagram of an exemplary window requesting human interaction for a no dial tone error. In this example, a window is an action (e.g., 680(3)=6803( )) in response to a threshold "3" count on a RAS ("680") no dial tone error.

FIG. 21 is a diagram of an exemplary window requesting human interaction for account issues. In this example, a window is an action (e.g., 691(3)=6913( )) in response to a threshold "3" count on a RAS ("691") account issues.

Exemplary Sending and Receiving Data Structures

In one example, connection logic stores information about status indicators in a status data structure. In one such example, the status data structure contains status records integrated into other components and/or other data structures (e.g., when status indicators are associated with properties or methods). In one such example, a status count data structure is associated with properties, methods, or attributes such as connectors, dialing rules, or phone books as discussed with respect to FIGS. 5, 10, and 11. In one such example, a status data structure is sent to a remote server for evaluation. In one such example, when a specific user contacts a customer service representative (e.g., via telephone, e-mail, etc), a status data structure received by a remote server, provides valuable information to the customer service representative for diagnosing and improving a customer's connection experience. In another example, a new status data structure (e.g., phone book) is received from a remote source, and used for future connection purposes. In one such example, a new status data structure is received without sending a present status data structure (e.g., improvements made without regard to status identifier counts in the present status data structure). Thus, actual connection request and connection status information is available on an individual basis based on a specific user's environment (e.g., as indicated by their logged status indicators) and or based on connection or network conditions in a region where a specific user is located (e.g., as indicated by aggregate information about plural user's logged status indicators). This allows individual responses to a specific user's environment (e.g., hardware, software, network connection, etc), or aggregate responses based on regional conditions (e.g., network traffic, etc).

In another example, a new (TBSR) data structure is received by connection logic. In another example, one or more new or updated actions (e.g., 620, 608, etc.) are received by connection logic. In this regard a new TBSR data structure with new status conditions, thresholds, and/or new actions are performed by the connection logic in subsequent connection sessions. This allows programmers to dynamically offer new and better responses to more or new status codes, as they are developed.

In one example, status data structures, threshold based response data structures, and/or new or updated responses are sent and/or received by connection logic with one or more remote servers. In one such example, the objects are sent and/or received in a serialized format (e.g., an XML file).

In another example, in addition to recorded status indicators recorded in a status data structure, an indicator of modem make, a modem model, a driver version, an OS version, and/or a connection speeds are sent to a remote server. In one example, the information is sent to the server a few minutes (e.g., five minutes) into a connection session.

In another example, a connector and/or a connection includes additional state and/or data such as a connection type (e.g., LAN, dial-up, etc.), a modem name, or Ethernet card type, a phone book identification, a line speed, a phone number(s), dialing rules (e.g., number to dial for outside line, number to block call waiting, area code, suffix number, long distance carrier requirements, number for credit card calls) and/or an IP address. Status indicator count records are associated with one or more of the described state and/or data properties.

In one example, recorded status indicators are stored in an XML file and will be sent or uploaded to a remote server for analysis. In one such example, a device receives an XML file comprising a new connector and/or phone book. In such an example, the phone book and/or connector objects comprise new methods and properties, along with any associated status record associations. A connection manager thereafter records status indicators in the new associated status records. In another example, the connection manager receives a new threshold based status response data structure and/or any associated new or improved methods called by the TBSR data structure (e.g., 620, 608, etc.).

In one example, a connection manager comprises a method discussed with respect to FIGS. 12, 13, 14, and or 15. In one such example, a status data structure is sent from a connection manager to a remote server. In another such example, a new status data structure is received by the connection manager wherein said new data structure includes a new status indicator count record (e.g., 512) not in a previous status data structure. Additionally, a connection manager receives a new threshold response data structure 600, that contains a new status indicator 602 and corresponding threshold value 604, and action 606. Additionally, a connection manage receives a new executable methods identified by the new threshold response data structure 622, 620. Thereafter, the connection manager counts the new status indicator(s) 512, determines that a threshold value is reached 604, and invokes a new executable method 622, 620. Thus, the provided technology provides a framework for evolving status based threshold responses based on individual user experiences as received and responded to, and or based on aggregate user experiences. In one such example, this is provided by sending and receiving status data structures, receiving threshold based response data structures, and receiving new threshold responses.

Computing Environment

Figure 22:
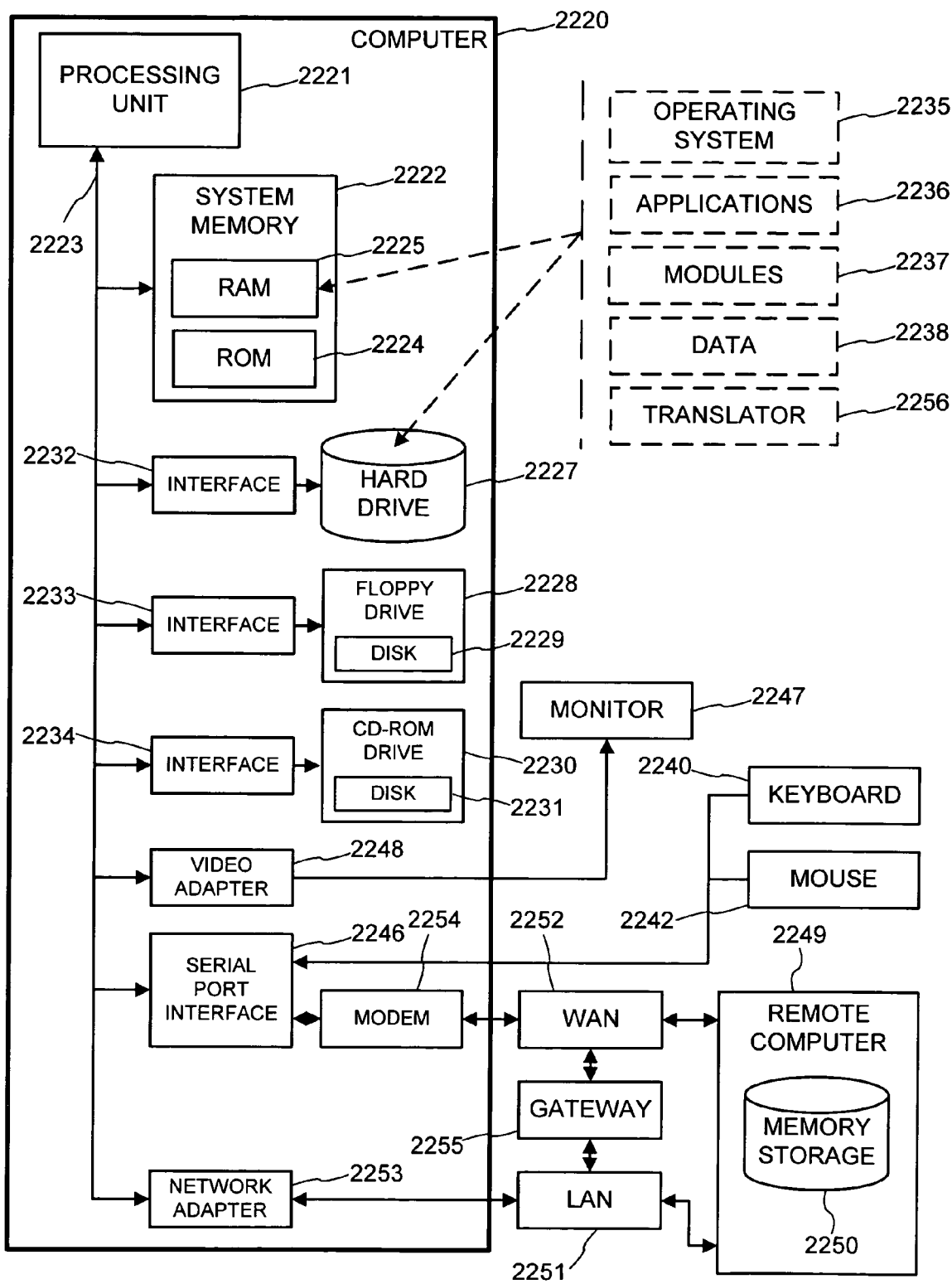
FIG. 22 is a block diagram of a distributed computer system implementing the described technologies.

FIG. 22 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 22, an exemplary system for implementation includes a conventional computer 2220 (such as personal computers, laptops, servers, mainframes, and other variety computers) includes a processing unit 2221, a system memory 2222, and a system bus 2223 that couples various system components including the system memory to the processing unit 2221. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 2221.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 2224 and random access memory (RAM) 2225. A basic input/output system (BIOS), containing the basic routines that help to transfer information between elements within the computer 2220, such as during start-up, is stored in ROM 2224.

The computer 2220 further includes a hard disk drive 2227, a magnetic disk drive 2228, e.g., to read from or write to a removable disk 2229, and an optical disk drive 2230, e.g., for reading a CD-ROM disk 2231 or to read from or write to other optical media. The hard disk drive 2227, magnetic disk drive 2228, and optical disk drive 2230 are connected to the system bus 2223 by a hard disk drive interface 2232, a magnetic disk drive interface 2233, and an optical drive interface 2234, respectively. The drives and their associated computer-readable media provide nonvolatile storage of data, data structures, computer-executable instructions, etc. for the computer 2220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 2225, including an operating system 2235, one or more application programs 2236, other program modules 2237, and program data 2238; in addition to an implementation 2256.

A user may enter commands and information into the computer 2220 through a keyboard 2240 and pointing device, such as a mouse 2242. These and other input devices are often connected to the processing unit 2221 through a serial port interface 2246 that is coupled to the system bus, but may be connected by other interfaces, such as a parallel port, game port or a universal serial bus (USB). A monitor 2247 or other type of display device is also connected to the system bus 2223 via an interface, such as a video adapter 2248. In addition to the monitor, computers typically include other peripheral output devices (not shown), such as speakers and printers.

The computer 2220 operates in a networked environment using logical connections to one or more remote computers, such as a remote computer 2249. The remote computer 2249 may be a server, a router, a peer device or other common network node, and typically includes many or all of the elements described relative to the computer 2220, although only a memory storage device 2250 has been illustrated. The logical connections depicted include a local area network (LAN) 2251 and a wide area network (WAN) 2252. Such networking environments are commonplace in offices, enterprise-wide computer networks, intranets and the Internet.

When used in a LAN networking environment, the computer 2220 is connected to the local network 2251 through a network interface or adapter 2253. When used in a WAN networking environment, the computer 2220 typically includes a modem 2254 or other means for establishing communications (e.g., via the LAN 2251 and a gateway or proxy server 2255) over the wide area network 2252, such as the Internet. The modem 2254, which may be internal or external, is connected to the system bus 2223 via the serial port interface 2246. In a networked environment, program modules depicted relative to the computer 2220, or portions thereof, may be stored in the remote memory storage device. It will be appreciated that the network connections shown are exemplary and other means of establishing a communications link between the computing devices may be used, wireless or otherwise.

ALTERNATIVES

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. On a computerized device including a processor, a remote access service, and a hardware device communicating with remote resources, a method of managing connections comprising:
   receiving a status indication from the remote access service;
   recording a status indication in a connection status data structure with plural status identifier counts;
   determining a highest count of said plural status identifier counts in the connection status data structure; and
   invoking an action identified in a threshold based status response data structure as corresponding with the determined highest count status identifier.

2. The method of claim 1 wherein the status indication is received in response to a connection request.

3. The method of claim 1 wherein the status indication is an error code indicating a busy telephone line, and the invoked action sets a disable flag associated with the busy telephone line.

4. The method of claim 3 wherein the disable flag disables the busy telephone line at least until a new telephone book is received.

5. The method of claim 1 wherein the status indication is received in response to an inquiry about an established connection.

6. The method of claim 3 wherein upon a next connection request session after a present session, input parameters to the next connection request comprise the next telephone number in the phone book after the busy telephone line.

7. The method of claim 1 wherein the connection status data structure comprises an XML file.

8. The method of claim 1 where the invoked action further comprises resetting the highest count status identifier.

9. The method of claim 1 wherein the invoked action comprises displaying a graphical user interface indicating a set of two or more actions that may resolve a condition causing the status indication.

10. The method of claim 1 wherein the connection status data structure comprises error codes returned on connection requests during multiple connection sessions.

11. The method of claim 10 wherein said multiple connection sessions are wireless.

12. The method of claim 1 wherein the status indication indicates state of an established connection.

13. The method of claim 1 performed by a connection manager managing connection requests invoked on the remote access service.

14. The method of claim 13 wherein the remote access service is Open Transport.

15. The method of claim 1 wherein the connection status data structure is associated with a phone book data structure.

16. The method of claim 1 wherein the threshold based status response data structure indicates no action on plural rows of the action column.

17. The method of claim 1 wherein the threshold based status response data structure identifies a same action for several status based threshold responses.

18. The method of claim 1 further comprising sending a copy of the connection status data structure out on a connection.

19. The method of claim 18 further comprising receiving a new connection status data structure on a connection.

20. The method of claim 18 further comprising receiving a new threshold based status response data structure on a connection.

21. The method of claim 20, further comprising receiving plural new methods identified in the new threshold based status response data structure.

22. The method of claim 21 wherein the received new threshold based status response data structure is received as an XML file.

23. A computer-readable medium having executable instructions for performing a method comprising:
   receiving a connection request;
   determining a highest count for a status indication;

determining a threshold based status response with a threshold value corresponding to the determined highest count;

performing the threshold based status response;

obtaining input parameters for a connection call;

invoking the connection call on a remote access service; and recording a connection status indicator received in response to the connection call.

24. The computer-readable medium of claim 23 wherein the executable instructions further comprise instructions for:

returning a connection handle to an entity sending the received connection request; and receiving the connection handle in a disconnection request received from the entity.

25. The computer-readable medium of claim 23 wherein the highest count is for all status indication records in a status data structure.

26. The computer readable medium of claim 25 wherein the executable instructions further comprise instructions for sending the status data structure out on an established connection and receiving a new status data structure on an established connection.

27. The computer-readable medium of claim 23 wherein the executable instructions further comprise instructions for determining threshold based status responses from a threshold based status response data structure.

28. The computer-readable medium of claim 27 wherein the executable instructions further comprise instructions for receiving new threshold based status response data structure on an established connection and using the received data structure for determining threshold based status responses.

29. The computer-readable medium of claim 23 wherein the obtained input parameters contain a property changed by the performed threshold based status response.

30. The computer-readable medium of claim 23 wherein upon executing the instructions a dial-up connection is established.

31. The computer-readable medium of claim 23 wherein upon executing the instructions a wireless connection is established.

32. A computer system comprising:

a processor coupled to memory;

software in memory comprising:

a remote access service;

a status data structure;

a status threshold response data structure;

threshold based status responses; and a connection manager for establishing and managing a connection to a remote resource wherein the connection manager includes instructions that invoke methods on the remote access service, receive connection status indications from the remote access service, count status indications in the status data structure, and invoke threshold based status responses when a status threshold value in the status threshold response data structure corresponds with a status count in the status data structure.

33. The system of claim 32 further comprising internal hardware for transmitting and receiving communications via the connection.

34. The system of claim 33 wherein the connection is via a wireless protocol.

35. The system of claim 32 wherein the connection manager includes instructions that receive a connection request directly from an application.

36. The system of claim 32 wherein the connection manager includes instructions that send the status data structure to a remote server, receive a new status data structure, and count subsequent status indications in the new status data structure.

37. The system of claim 32 wherein the connection manager includes instructions that receive a new status threshold response data structure and one or more threshold based status responses.

* * * * *